(12) United States Patent
Lee

(10) Patent No.: US 11,418,923 B2
(45) Date of Patent: Aug. 16, 2022

(54) ASSET TRACKING COMMUNICATION DEVICE

(71) Applicant: AMOSENSE CO., LTD, Cheonan-si (KR)

(72) Inventor: Sangyeoll Lee, Seoul (KR)

(73) Assignee: AMOSENSE CO., LTD, Cheonan-si (KR)

( * ) Notice: Subject to any disclaimer, the term of this patent is extended or adjusted under 35 U.S.C. 154(b) by 0 days.

(21) Appl. No.: 17/292,374

(22) PCT Filed: Nov. 8, 2019

(86) PCT No.: PCT/KR2019/015209
§ 371 (c)(1),
(2) Date: May 7, 2021

(87) PCT Pub. No.: WO2020/096431
PCT Pub. Date: May 14, 2020

(65) Prior Publication Data
US 2022/0014878 A1 Jan. 13, 2022

(30) Foreign Application Priority Data
Nov. 9, 2018 (KR) .......................... 10-2018-0137564

(51) Int. Cl.
*H04W 4/029* (2018.01)
*H04W 4/38* (2018.01)
*H04W 4/35* (2018.01)
*H04W 76/14* (2018.01)
(Continued)

(52) U.S. Cl.
CPC ........... *H04W 4/029* (2018.02); *H04W 4/025* (2013.01); *H04W 4/35* (2018.02); *H04W 4/38* (2018.02);
(Continued)

(58) Field of Classification Search
CPC ............ G06Q 10/0833; G06Q 10/087; G06Q 10/083; G06Q 10/0832; G06Q 10/0838;
(Continued)

(56) References Cited

U.S. PATENT DOCUMENTS

| 2007/0040647 A1* | 2/2007 | Saenz | ..................... H04W 4/40 340/3.1 |
| 2007/0260691 A1* | 11/2007 | Kallqvist | ................ H04L 51/38 709/206 |

(Continued)

FOREIGN PATENT DOCUMENTS

| JP | 4205029 B | 1/2009 |
| KR | 10-2005-0092042 A | 9/2005 |

(Continued)

*Primary Examiner* — Dung Hong
(74) *Attorney, Agent, or Firm* — Maschoff Brennan

(57) ABSTRACT

Disclosed is an asset tracking communication device, which transmits only essential information through a low power wide area communication during asset transport, stores remaining information, and then transmits the stored information at a position capable of a high-speed communication. The disclosed asset tracking communication device transmits all or a part of the freight transport information according to a communication environment in a process of transporting the freight, stores information not transmitted, and then transmits the information under a high-speed communication environment, thereby minimizing information lost upon asset tracking.

10 Claims, 5 Drawing Sheets

(51) Int. Cl.
  *H04W 4/80* (2018.01)
  *H04W 4/02* (2018.01)
  *H04W 48/16* (2009.01)

(52) U.S. Cl.
  CPC ............. *H04W 4/80* (2018.02); *H04W 48/16* (2013.01); *H04W 76/14* (2018.02)

(58) Field of Classification Search
  CPC ... G06Q 50/30; G06Q 30/0267; H04W 4/029; H04W 4/80; H04W 4/38; H04W 4/02; H04W 4/35
  See application file for complete search history.

(56) References Cited

U.S. PATENT DOCUMENTS

| | | | | |
|---|---|---|---|---|
| 2009/0042561 | A1* | 2/2009 | Jackson | H04W 24/08 455/426.1 |
| 2011/0125663 | A1 | 5/2011 | Kraft | |
| 2013/0100819 | A1* | 4/2013 | Anchan | H04W 48/20 370/241 |
| 2015/0070191 | A1* | 3/2015 | Westick | H04Q 9/00 340/870.07 |
| 2017/0195848 | A1* | 7/2017 | Korneluk | H04W 4/80 |
| 2018/0359107 | A1* | 12/2018 | Asher | G06V 20/635 |
| 2019/0034855 | A1* | 1/2019 | Halioris | G06Q 10/063114 |

FOREIGN PATENT DOCUMENTS

| | | | | |
|---|---|---|---|---|
| KR | 10-2013-0113040 A | | 10/2013 | |
| WO | WO-2013100275 A1 * | | 7/2013 | ............ B60W 40/09 |
| WO | WO-2017117652 A1 * | | 7/2017 | ............. G01S 19/03 |

* cited by examiner

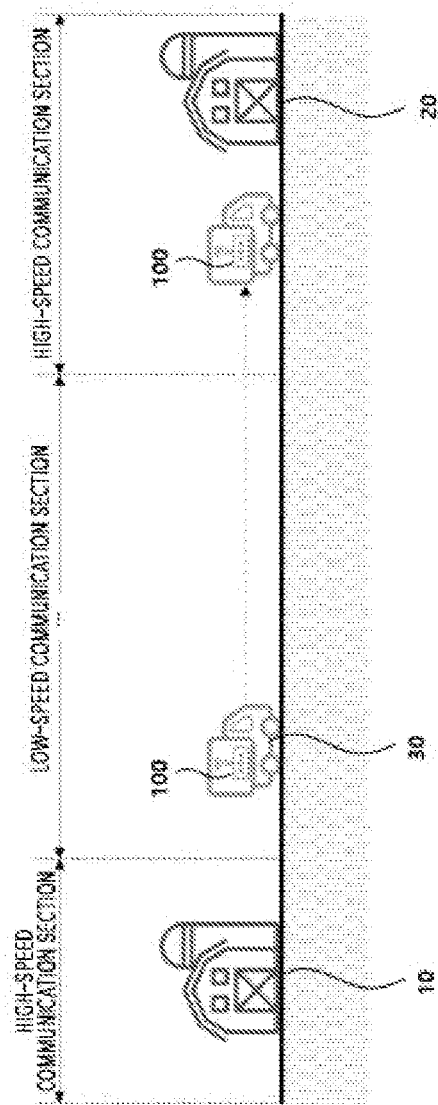
[FIG. 1]

[FIG. 2]
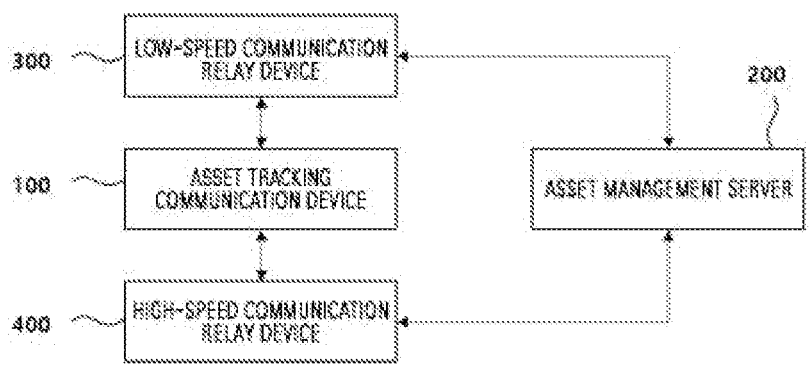
[FIG. 3]
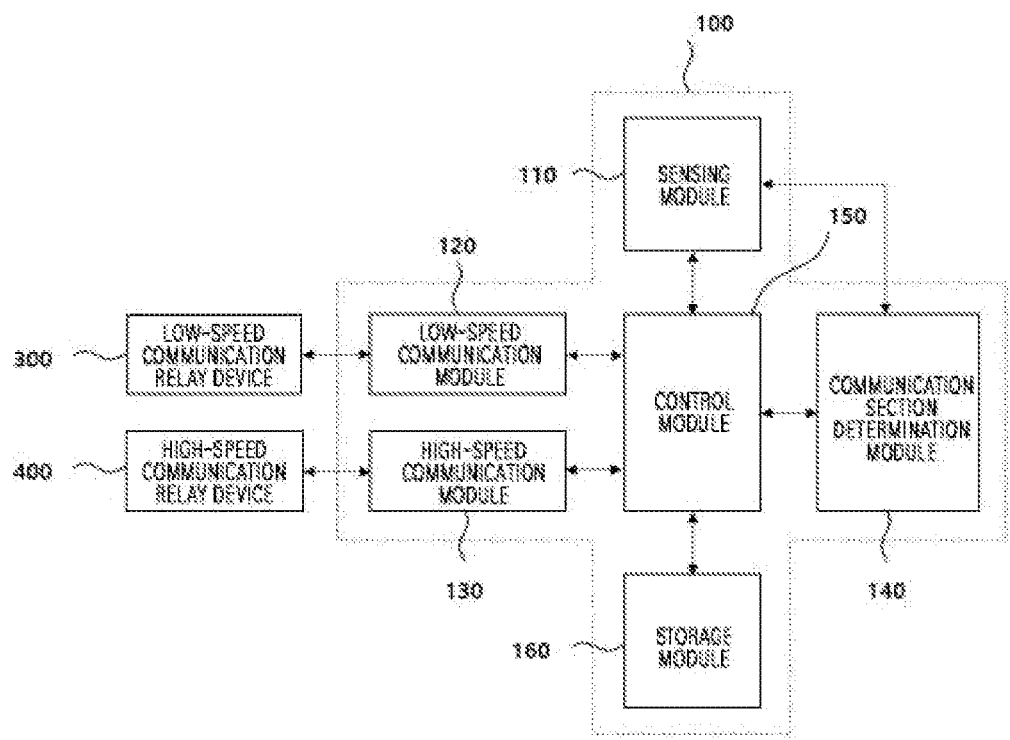

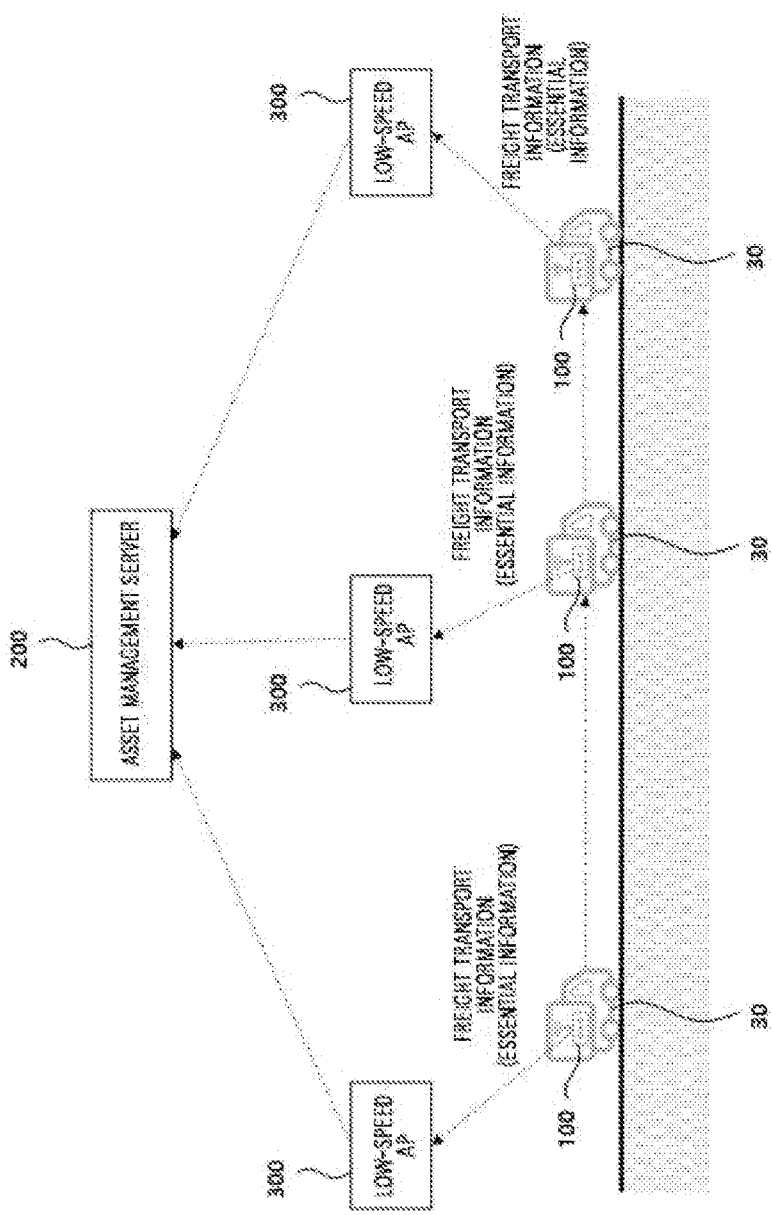
[FIG. 4]

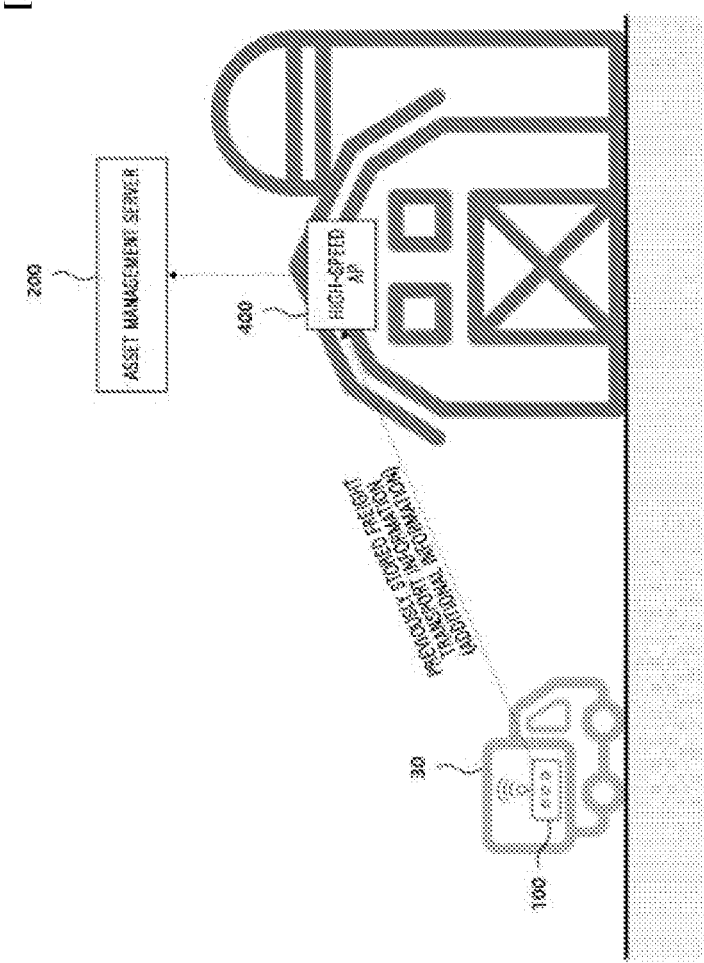

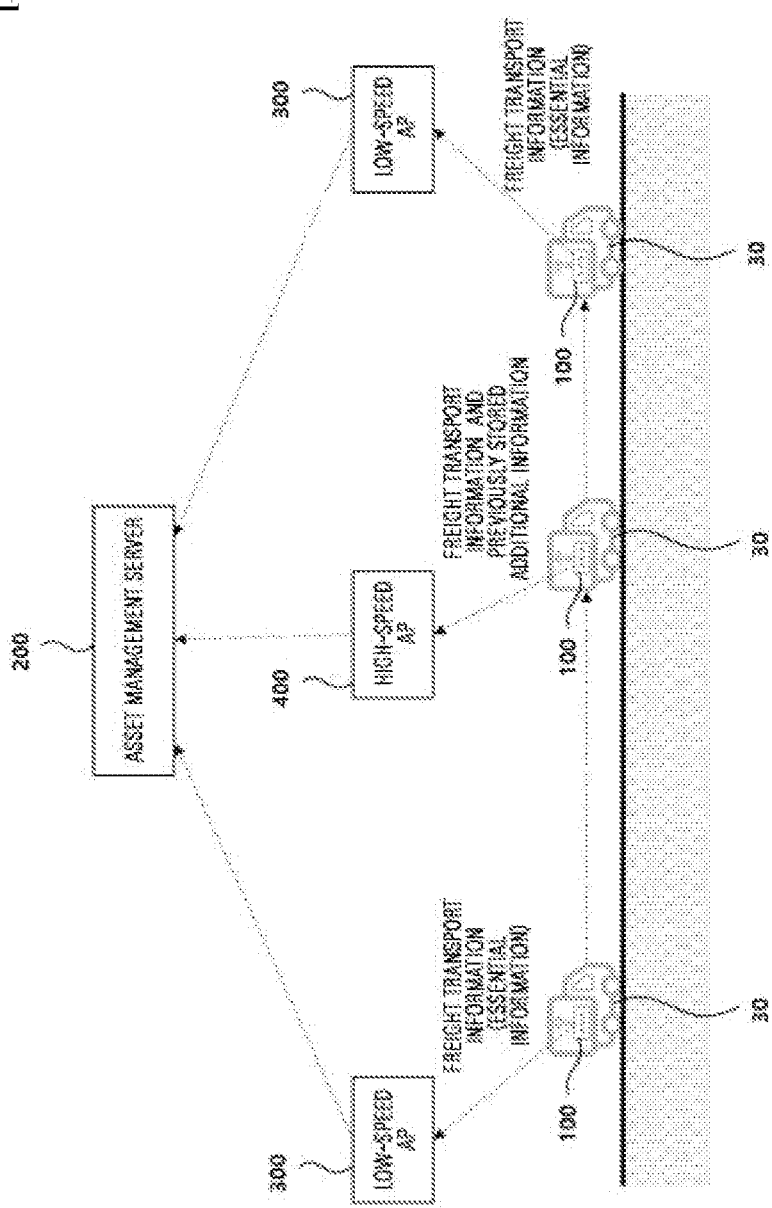

ASSET TRACKING COMMUNICATION DEVICE

TECHNICAL FIELD

The present disclosure relates to an asset tracking communication device, and more specifically, to an asset tracking communication device mounted on a mobile body to transmit information relevant to the movable body or a load to a management server.

BACKGROUND ART

A container is used to transport a freight efficiently and economically. The container loads the freight mounted on a pallet and then is transported through a transport means such as a vehicle, a ship, and an airplane.

Since the container is left unattended in a port, a warehouse, or the like for a long time before being loaded into the transportation means, or left unattended in the transport means for a long time and used, a theft accident of the freight loaded in the container, an additional accident of the illegal freight, or the like occurs frequently.

Therefore, for the safe transport of the freight, various sensors are installed on a transport structure such as the container or the pallet, and an asset tracking technology for transmitting sensing information and position information collected by the sensors to the management server is applied.

The asset tracking technology uses a communication network for transmitting the sensing information collected from the transport structure to the management server. At this time, low power wide area (LPWA) communications such as Sigfox, LoRa, NB-IoT, and LTE-CAT.M1 are used in the asset tracking technology.

Since the low power wide area communication is characterized by a low power, it is applied to a transport field in which a power source supply is limited. However, since the low power wide area communication may not transmit a large amount of data due to a low transmission rate and a traffic limit and the communication is available in only an area where the corresponding communication network is installed, there is a problem in that an accurate asset tracking is difficult due to an increase in information lost during asset tracking.

SUMMARY OF INVENTION

Technical Problem

The present disclosure is proposed to solve the conventional problem, and an object of the present disclosure is to provide an asset tracking communication device, which transmits only essential information through a low power wide area communication while an asset is moving, stores remaining information and then transmits the stored information at a position capable of a high-speed communication.

Solution to Problem

To achieve the object, an asset tracking communication device according to an exemplary embodiment of the present disclosure includes a sensing module composed of a plurality of sensors to collect freight transport information of a freight transported by a transport means, a low-speed communication module for transmitting only essential information among the freight transport information collected by the sensing module to an asset management server, a high-speed communication module for transmitting the entire freight transport information collected by the sensing module to the asset management server, a communication section determination module for determining, as a communication section, one of a low-speed communication section and a high-speed communication section based on the freight transport information collected by the sensing module, and a control module for activating one of the low-speed communication module and the high-speed communication module based on the communication section determined by the communication section determination module.

The communication section determination module may transmit an activation request to the high-speed communication module when determining a communication section as a high-speed communication section, and determine the communication section as the high-speed communication section when a network constitution of the high-speed communication module is completed. At this time, the communication section determination module may determine that the freight enters a specific area when a setting time elapses after sensing that a motion of the freight stops, determine that the freight enters a specific area when an embedded NFC tags an NFC reader installed in the specific area, determine that a position of the freight is included in position information of a specific area and the freight enters the specific area, determine that the freight enters a specific area when a MAC address collected from a communication terminal of the specific area matches with a standard MAC address, or determine that the freight enters a specific area when receiving a network constitution request in the specific area from the communication module to transmit the activation request to the high-speed communication module.

The high-speed communication module may constitute a network by pairing with one of Blue-tooth APs in a specific area after a beacon scan or a device advertising when receiving the activation request from the communication section determination module.

The asset tracking communication device further includes a storage module for storing additional information excluding essential information among the freight transport information transmitted by the low-speed communication module, and the high-speed communication module transmits the additional information stored in the storage module to the asset management server.

Advantageous Effects of Invention

According to the present disclosure, the asset tracking communication device may transmit all or a part of the freight transport information according to the communication environment, store the information not transmitted, and then transmit the information under the high-speed communication environment, thereby minimizing the information lost during asset tracking.

Further, the asset tracking communication device may transmit all or a part of the freight transport information according to the communication environment, store the information not transmitted, and then transmit the information under the high-speed communication environment, thereby also collecting the multimedia information, such as images and videos, relevant to the freight transport, as the freight transport information and accurately confirming the history relevant to the freight transport through these information.

BRIEF DESCRIPTION OF DRAWINGS

FIGS. 1 to 3 are diagrams for explaining an asset tracking communication device according to an exemplary embodiment of the present disclosure.

FIGS. 4 and 5 are diagrams for explaining a freight transport information transmission of the asset tracking communication device according to the exemplary embodiment of the present disclosure under a low-speed communication environment.

FIG. 6 is a diagram for explaining a freight transport information transmission of the asset tracking communication device according to the exemplary embodiment of the present disclosure under a high-speed communication environment.

DESCRIPTION OF EMBODIMENTS

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Referring to FIGS. 1 and 2, an asset tracking communication device 100 according to an exemplary embodiment of the present disclosure is a hybrid communication device for transmitting to an asset management server 200 freight transport information collected upon freight transport through a low-speed communication and a high-speed communication in consideration of being exposed to a high-speed communication environment in a specific area 20 (indoor domain/position) such as a storage or a final destination.

The asset tracking communication device 100 collects the freight transport information in a process of transporting a freight through a transport means 30 from a point of departure 10 to the specific area 20. That is, the asset tracking communication device 100 is directly mounted on the freight or mounted on a container or a pallet in which the freight is loaded. The asset tracking communication device 100 collects freight transport information including information relevant to the freight transport upon freight transport.

The asset tracking communication device 100 transmits some or all of the collected freight transport information according to a communication connection state to the asset management server 200. That is, the asset tracking communication device 100 transmits only essential information among the freight transport information collected through the low-speed communication (e.g., low-power wide area communication) during freight transport (outdoor domain/position) to the asset management server 200, and stores remaining additional information. The asset tracking communication device 100 transmits additional information stored through the high-speed communication to the asset management server 200 if a setting condition is satisfied in the specific area 20.

The asset tracking communication device 100 classifies a transport section in which a high-speed communication repeater is not installed and a low-speed communication repeater is installed into a low-speed communication section. At this time, the low-speed communication repeater operates at a low power, such as Sigfox, LoRa, NB-IoT, WiSUN, or the like for supporting a low power wide area (LPWA) communication and is composed of a repeater capable of transmission of a small amount of data.

The asset tracking communication device 100 transmits the freight transport information to the asset management server 200 through the low-speed communication upon freight movement. At this time, since the low-speed communication has a traffic limit, the asset tracking communication device 100 transmits only essential information among the information included in the collected freight transport information to the asset management server 200. The asset tracking communication device 100 stores additional information other than the essential information.

The asset tracking communication device 100 classifies peripheries of the point of departure 10 and the specific area 20 in which the high-speed communication repeater is installed into a high-speed communication section. At this time, the high-speed communication repeater is composed of a repeater capable of transmission of a large amount of data, such as Wi-Fi, a short-range communication (NFC), a Blue-tooth (BLE), and an UHF, and the high-speed communication section is an area within a communication radius of the high-speed communication repeater.

The asset tracking communication device 100 transmits the freight transport information stored during freight transport to the asset management server 200 through the high-speed communication repeater when entering the high-speed communication section capable of the high-speed communication. The asset tracking communication device 100 determines the entry of the high-speed communication section through various algorithms, and constitutes a local network with the asset management server 200 through the high-speed communication repeater upon entering the high-speed communication section. The asset tracking communication device 100 transmits the freight transport information to the asset management server 200 through the constituted local network.

As a result, the asset tracking communication device 100 may transmit all or a part of the freight transport information according to the communication environment, store information not transmitted, and then transmit the information under the high-speed communication environment, thereby minimizing information lost upon asset tracking.

Further, the asset tracking communication device 100 may transmit all or a part of the freight transport information according to the communication environment, store information not transmitted, and then transmit the information under the high-speed communication environment, thereby also collecting multimedia information, such as images or videos relevant to the freight transport, as the freight transport information, and accurately confirming a history relevant to the freight transport through these information.

Referring to FIG. 3, the asset tracking communication device 100 according to the exemplary embodiment of the present disclosure is configured to include a sensing module 110, a low-speed communication module 120, a high-speed communication module 130, a communication section determination module 140, a control module 150, and a storage module 160.

The sensing module 110 collects the freight transport information according to the freight transport. The sensing module 110 is configured to include various sensors, and collects the freight transport information including the position, temperature, humidity, shock, altitude, and the like of the freight.

The sensing module 110 is configured to include a photographing means such as a camera or a camcorder, and may also collect the freight transport information including multimedia information such as images or videos relevant to the freight transport.

To this end, the sensing module 110 may be configured to include various sensing modules 110, such as a position measurement module, a thermometer, a hygrometer, a shock collection sensor, a gyro sensor, an accelerometer, a speed sensor, an altitude sensor, and a fire collection sensor. Here, the position measurement module may also provide measured position information to the communication section determination module 140.

The low-speed communication module 120 transmits and receives data to and from the low-speed communication repeater to transmit the freight transport information to the asset management server 200. The low-speed communication module 120 transmits essential information among the freight transport information to the asset management server 200 in the low-speed communication section. The low-speed communication module 120 transmits the essential information among the freight transport information through Sigfox, LoRa, NB-IoT, WiSUN, or the like for supporting the low power wide area (LPWA).

The high-speed communication module 130 transmits and receives data to and from the high-speed communication repeater to transmit the freight transport information to the asset management server 200. The high-speed communication module 130 transmits all of the freight transport information to the asset management server 200 in the high-speed communication section. The high-speed communication module 130 transmits all information collected as the freight transport information through Wi-Fi, a short-range communication (NFC), a Blue-tooth (BLE), an UHF, or the like. Here, the freight transport information transmitted by the high-speed communication module 130 may be real-time information collected by the sensing module 110 or past information stored in the storage module 160 in the low-speed communication section.

As an example, the high-speed communication module 130 will be described as being a Blue-tooth communication module, for example. When receiving a network constitution request from the communication section determination module 140 which determines that the freight is positioned in the specific area 20, the high-speed communication module 130 performs a beacon scan for the specific area 20. That is, the high-speed communication module 130 constitutes a short-range wide area communication network by finding and pairing with a Blue-tooth AP capable of a short-range wide area communication when the freight is positioned in the specific area 20. At this time, the Blue-tooth AP installed in the specific area 20 alternately sends a beacon and waits for connection.

Thereafter, the high-speed communication module 130 transmits the freight transport information stored in the storage module 160 through the Blue-tooth according to a control of the control module 150. At this time, the high-speed communication module 130 may also transmit all of the freight transport information collected by the sensing module 110 in real time and the freight transport information stored in the storage module 160 during freight transport.

As another example, when receiving the network constitution request from the communication section determination module 140, the high-speed communication module 130 starts a device advertising including a device ID in the specific area 20. At this time, the Blue-tooth APs installed in the specific area 20 transmit a connection request to the high-speed communication module 130 when receiving the effective device ID. Therefore, the high-speed communication module 130 constitutes the short-range wide area communication network by pairing with the Blue-tooth AP, and transmits the information stored through the Blue-tooth.

Thereafter, the high-speed communication module 130 transmits the freight transport information stored in the storage module 160 through the Blue-tooth according to a control of the control module 150. At this time, the high-speed communication module 130 may also transmit all of the freight transport information collected by the sensing module 110 in real time and the freight transport information stored in the storage module 160 during freight transport.

Meanwhile, the high-speed communication module 130 may also transmit the freight transport information by constituting a network with the high-speed communication repeater through an NFC Data Exchange, an UHF RFID Data Exchange, or the like according to the high-speed communication repeater installed in the specific area 20.

The communication section determination module 140 determines, as a communication section, one of the low-speed communication section and the high-speed communication section based on an environment change according to the freight transport. That is, the communication section determination module 140 determines the low-speed communication section as the communication section upon entry of the transport section from the point of departure 10 because only the low-speed communication environment is provided in the transport section. The communication section determination module 140 sets the high-speed communication section as the communication section upon entry of the specific area 20 in the transport section because the high-speed communication environment is provided at the periphery of the specific area 20.

To this end, the communication section determination module 140 determines one of the low-speed communication section and the high-speed communication section as the communication section based on the freight transport information collected by the sensing module 110.

As an example, the communication section determination module 140 collects the motion of the freight based on the accelerometer of the sensing module 110. The communication section determination module 140 counts a time when the motion of the freight stops, and determines that the freight is positioned in the specific area 20 (i.e., destination) when a setting time elapses after the motion of the freight stops.

The communication section determination module 140 activates the high-speed communication module 130 and transmits the network constitution request when determining that the freight is positioned in the specific area 20. The communication section determination module 140 determines the communication section as the high-speed communication section when the network constitution of a high-speed communication relay device 400 with the high-speed communication module 130 is completed.

As another example, the communication section determination module 140 determines the entry of the specific area 20 through an NFC reader installed in the specific area 20 and an embedded NFC tag. The communication section determination module 140 activates the high-speed communication module 130 and transmits the network constitution request when determining that the freight enters the specific area 20. The communication section determination module 140 determines the communication section as the high-speed communication section when the network constitution of the high-speed communication relay device 400 with the high-speed communication module 130 is completed.

As still another example, the communication section determination module 140 determines that the freight enters the specific area 20 based on position information. That is, the communication section determination module 140 manages the position information for the high-speed communication section, and determines that the freight enters the specific area 20 if position information collected by the sensing module 110 is included in stored position information. The communication section determination module 140 determines the communication section as the high-speed communication section when the network constitution of the high-speed communication relay device 400 with the high-speed communication module 130 is completed.

As yet another example, the communication section determination module 140 determines that the freight enters the specific area 20 when a MAC address collected by a Wi-Fi Sniffing or a Blue-tooth beacon scan matches with a standard MAC address (Wi-Fi White List MAC address) to activate the high-speed communication module 130 and transmit the network constitution request. The communication section determination module 140 determines the communication section as the high-speed communication section when the network constitution of the high-speed communication relay device 400 with the high-speed communication module 130 is completed.

As still yet another example, the UHF RFID reader installed in the specific area 20 perceives the Device ID of the asset tracking communication device 100 to transmit the network constitution request. The communication section determination module 140 determines that the freight enters the specific area 20 when receiving the network constitution request from the UHF RFID reader to activate the high-speed communication module 130 and transmit the network constitution request. The communication section determination module 140 determines the communication section as the high-speed communication section when the network constitution of the high-speed communication relay device 400 with the high-speed communication module 130 is completed.

The control module 150 selects one of the low-speed communication module 120 and the high-speed communication module 130 based on the determination result of the communication section determination module 140. The control module 150 transmits all or a part of the freight transport information to the selected communication module.

The control module 150 transmits the freight transport information to the low-speed communication module 120 when the communication section determination module 140 determines the communication section as the low-speed communication section. That is, when the communication section determination module 140 determines the communication section as the low-speed communication section, the control module 150 detects only essential information among the information included in the freight information to transmit the detected essential information to the low-speed communication module 120. The control module 150 transmits remaining information (i.e., additional information) excluding the essential information among the freight transport information to the storage module 160.

Referring to FIG. 4, the low-speed communication module 120 transmits the freight transport information to the asset management server 200 through a low-speed AP (i.e., low-speed communication relay device 300) in the low-speed communication section according to a control of the control module 150. At this time, the low-speed communication module 120 transmits only the essential information among the freight transport information to the low-speed AP.

The control module 150 transmits the freight transport information to the high-speed communication module 130 when the communication section determination module 140 determines the communication section as the high-speed communication section. When the freight transport information stored in the storage module 160 exists, the control module 150 detects the freight transport information from the storage module 160 to transmit the detected freight transport information to the high-speed communication module 130.

Referring to FIG. 5, the high-speed communication module 130 transmits all of the freight transport information to the asset management server 200 through a high-speed AP (i.e., high-speed communication relay device 400) in the high-speed communication section according to a control of the control module 150. At this time, when the freight transport information stored in the storage module 160 exists, the high-speed communication module 130 also transmits previously stored freight transport information to the asset management server 200 through the high-speed AP.

Referring to FIG. 6, the low-speed communication module 120 transmits the freight transport information (essential information) to the asset management server 200 through the low-speed AP (i.e., low-speed communication relay device 300) in the low-speed communication section according to a control of the control module 150.

When the freight enters the high-speed communication section during freight transport, the high-speed communication module 130 transmits the entire freight transport information and the freight transport information stored in the storage module 160 to the asset management server 200 through the high-speed AP (i.e., high-speed communication relay device 400) according to a control of the control module 150.

The storage module 160 stores information not transmitted to the asset management server 200 (i.e., additional information) among the freight transport information according to a control of the control module 150. When the control module 150 detects and transmits the stored freight transport information (i.e., additional information) to the asset management server 200 through the high-speed communication module 130, the storage module 160 deletes the corresponding freight transport information.

As described above, the asset tracking communication device 100 transmits to the asset management server 200 the freight transport information including only IoT sensing data, which are the essential information under the low-speed communication environment, such as Sigfox, in the low-speed communication section (i.e., low-power wide area communication environment). At this time, the asset tracking communication device 100 may also transmit media-armed sensing data under the low-speed communication environment, such as Sigfox, at a low quality.

The asset tracking communication device 100 transmits the freight transport information including the IoT sensing data and the media to the asset management server 200 under the stable communication environment, such as NB-IoT or CAT-M1, among the low-power wide area communication environments. At this time, the asset tracking communication device 100 transmits the freight transport information including the media with the quality higher than that of the media transmitted under the low-speed communication environment and lower than that of original media.

The asset tracking communication device 100 transmits the freight transport information including the IoT sensing data, the media, and the multimedia traffic to the asset management server 200 under the high-speed communication environment, such as BLE or Wi-Fi. At this time, the media and the multimedia traffic are transmitted in original states.

As a result, the asset tracking communication device 100 may transmit all or a part of the freight transport information according to the communication environment, store the information not transmitted, and then transmit the information under the high-speed communication environment, thereby minimizing the information lost upon asset tracking.

Further, the asset tracking communication device 100 may transmit all or a part of the freight transport information according to the communication environment, store the information not transmitted, and then transmit the information under the high-speed communication environment, thereby also collecting the multimedia information, such as images and videos, relevant to the freight transport, as the freight transport information and accurately confirming the history relevant to the freight transport through these information.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An asset tracking communication device comprising:
   a sensing module composed of a plurality of sensors to collect freight transport information of a freight transported by a transport means;
   a low-speed communication module for transmitting only essential information among the freight transport information collected by the sensing module to an asset management server;
   a high-speed communication module for transmitting the freight transport information collected by the sensing module to the asset management server;
   a communication section determination module for determining, as a communication section, one of a low-speed communication section and a high-speed communication section based on the freight transport information collected by the sensing module;
   a control module for activating one of the low-speed communication module and the high-speed communication module based on the communication section determined by the communication section determination module; and
   a storage module for storing additional information excluding essential information among the freight transport information transmitted by the low-speed communication module.

2. The asset tracking communication device of claim 1, wherein the communication section determination module transmits an activation request to the high-speed communication module when determining a communication section as a high-speed communication section, and determines the communication section as the high-speed communication section when a network constitution of the high-speed communication module is completed.

3. The asset tracking communication device of claim 2, wherein the communication section determination module determines that the freight enters a specific area when a setting time elapses after sensing that a motion of the freight stops to transmit the activation request to the high-speed communication module.

4. The asset tracking communication device of claim 2, wherein the communication section determination module determines that the freight enters a specific area when an embedded NFC tag is tagged with an NFC reader installed in the specific area, and transmits the activation request to the high-speed communication module when determining that the freight enters the specific area.

5. The asset tracking communication device of claim 2, wherein the communication section determination module determines that the freight enters a specific area when a position of the freight is included in position information of the specific area, and transmits the activation request to the high-speed communication module when determining that the freight enters the specific area.

6. The asset tracking communication device of claim 2, wherein the communication section determination module determines that the freight enters a specific area when a MAC address collected from a communication terminal of the specific area matches with a standard MAC address, and transmits the activation request to the high-speed communication module when determining that the freight enters the specific area.

7. The asset tracking communication device of claim 2, wherein the communication section determination module determines that the freight enters a specific area when receiving a network constitution request in the specific area from the communication module, and transmits the activation request to the high-speed communication module when determining that the freight enters the specific area.

8. The asset tracking communication device of claim 2, wherein the high-speed communication module constitutes a network by pairing with one of Blue-tooth APs in a specific area after a beacon scan when receiving the activation request from the communication section determination module.

9. The asset tracking communication device of claim 2, wherein the high-speed communication module constitutes a network by pairing with one of Blue-tooth APs in a specific area after a device advertising when receiving the activation request from the communication section determination module.

10. The asset tracking communication device of claim 1, wherein the high-speed communication module transmits the additional information stored in the storage module to the asset management server.

* * * * *